(12) United States Patent
Maes (10) Patent No.: US 7,873,716 B2
(45) Date of Patent: Jan. 18, 2011

(54) METHOD AND APPARATUS FOR SUPPORTING SERVICE ENABLERS VIA SERVICE REQUEST COMPOSITION

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1027 days.

(21) Appl. No.: 10/856,588

(22) Filed: May 28, 2004

(65) Prior Publication Data

US 2005/0021670 A1      Jan. 27, 2005

Related U.S. Application Data (60) Provisional application No. 60/483,592, filed on Jun. 27, 2003.

(51) Int. Cl.
*G06F 15/16*      (2006.01)

(52) U.S. Cl. .................. 709/223; 709/217; 709/227

(58) Field of Classification Search .............. 709/203, 709/217, 223, 227, 228
See application file for complete search history.

(56) References Cited

U.S. PATENT DOCUMENTS

| | | | |
|---|---|---|---|
| 5,699,513 A | 12/1997 | Feigen et al. | |
| 5,850,517 A | 12/1998 | Verkler et al. | |
| 6,157,941 A | 12/2000 | Verkler et al. | |
| 6,230,271 B1 | 5/2001 | Wadlow et al. | |
| 6,336,138 B1 | 1/2002 | Caswell et al. | |
| 6,374,305 B1 | 4/2002 | Gupta et al. | |
| 6,466,984 B1 | 10/2002 | Naveh et al. | |
| 6,578,159 B1 | 6/2003 | Kitagawa et al. | |
| 6,611,812 B2 | 8/2003 | Hurtado et al. | |
| 6,748,570 B1 | 6/2004 | Bahrs et al. | |
| 6,792,605 B1 * | 9/2004 | Roberts et al. | 719/313 |
| 6,978,348 B2 | 12/2005 | Belknap et al. | |
| 6,985,939 B2 * | 1/2006 | Fletcher et al. | 709/223 |
| 7,003,578 B2 | 2/2006 | Kanada et al. | |
| 7,042,988 B2 | 5/2006 | Juitt et al. | |
| 7,111,060 B2 | 9/2006 | Araujo et al. | |
| 7,114,146 B2 * | 9/2006 | Zhang et al. | 717/106 |
| 7,114,148 B2 * | 9/2006 | Irving et al. | 717/121 |
| 7,143,092 B1 | 11/2006 | Gregorat | |
| 7,146,616 B2 | 12/2006 | Dorner et al. | |
| 7,185,342 B1 * | 2/2007 | Carrer et al. | 719/313 |
| 7,194,482 B2 * | 3/2007 | Larkin et al. | 707/104.1 |
| 7,222,334 B2 * | 5/2007 | Casati et al. | 717/136 |
| 7,272,625 B1 | 9/2007 | Hannel et al. | |

(Continued)

OTHER PUBLICATIONS

Maes, Stephanie, Multi-modal Web IBM Position W3C/WAP Workshop, IBM Research Human Language Technologies, downloaded http://www.w3.org on May 26, 2003, 9 pages.

(Continued)

*Primary Examiner*—Kevin Bates
(74) *Attorney, Agent, or Firm*—Townsend and Townsend and Crew LLP (57) ABSTRACT

A computer system includes a composition enabler configured to enforce an execution policy associated with a responder in response to a request from a requestor, configured to send the request to the responder, and configured to compose a response with a function from the group: a function that must be executed before the request reaches the responder, a function that must be executed after a response from the responder.

15 Claims, 7 Drawing Sheets

U.S. PATENT DOCUMENTS

| | | | |
|---|---|---|---|
| 7,340,508 B1* | 3/2008 | Kasi et al. | 709/219 |
| 7,409,707 B2 | 8/2008 | Swander et al. | |
| 7,411,943 B2 | 8/2008 | Kittredge et al. | |
| 7,433,838 B2 | 10/2008 | Welsh et al. | |
| 7,447,793 B2 | 11/2008 | Morioka | |
| 7,454,399 B2 | 11/2008 | Matichuk | |
| 7,461,062 B2 | 12/2008 | Stewart et al. | |
| 7,472,349 B1* | 12/2008 | Srivastava et al. | 709/206 |
| 7,580,994 B1 | 8/2009 | Fiszman et al. | |
| 7,617,521 B2 | 11/2009 | Maes | |
| 7,752,634 B1* | 7/2010 | Saxena et al. | 709/226 |
| 2002/0087674 A1 | 7/2002 | Guilford et al. | |
| 2002/0101879 A1* | 8/2002 | Bouret et al. | 370/465 |
| 2002/0111848 A1* | 8/2002 | White | 705/10 |
| 2002/0143819 A1 | 10/2002 | Han et al. | |
| 2002/0178122 A1 | 11/2002 | Maes | |
| 2002/0184373 A1 | 12/2002 | Maes | |
| 2002/0194388 A1 | 12/2002 | Boloker et al. | |
| 2002/0198719 A1 | 12/2002 | Gergic et al. | |
| 2002/0198991 A1 | 12/2002 | Gopalakrishnan et al. | |
| 2003/0003953 A1 | 1/2003 | Houplain | |
| 2003/0023953 A1 | 1/2003 | Lucassen et al. | |
| 2003/0046316 A1 | 3/2003 | Gergic et al. | |
| 2003/0061268 A1* | 3/2003 | Moerdijk et al. | 709/201 |
| 2003/0061404 A1 | 3/2003 | Atwal et al. | |
| 2003/0115203 A1 | 6/2003 | Brown et al. | |
| 2003/0115260 A1 | 6/2003 | Edge | |
| 2003/0131076 A1 | 7/2003 | Nelson et al. | |
| 2003/0191769 A1* | 10/2003 | Crisan et al. | 707/100 |
| 2003/0208539 A1 | 11/2003 | Gildenblat et al. | |
| 2003/0217044 A1 | 11/2003 | Zhang et al. | |
| 2003/0229812 A1 | 12/2003 | Buchholz | |
| 2004/0015547 A1 | 1/2004 | Griffin et al. | |
| 2004/0024720 A1 | 2/2004 | Fairweather | |
| 2004/0064528 A1 | 4/2004 | Meredith et al. | |
| 2004/0068586 A1* | 4/2004 | Xie et al. | 709/246 |
| 2004/0110493 A1 | 6/2004 | Alvarez et al. | |
| 2004/0128546 A1 | 7/2004 | Blakley et al. | |
| 2004/0139319 A1 | 7/2004 | Favazza et al. | |
| 2004/0176988 A1* | 9/2004 | Boughannam | 705/4 |
| 2004/0221005 A1* | 11/2004 | Albaugh et al. | 709/203 |
| 2005/0015340 A1 | 1/2005 | Maes | |
| 2005/0054287 A1 | 3/2005 | Kim | |
| 2005/0086197 A1 | 4/2005 | Boubez et al. | |
| 2005/0086297 A1 | 4/2005 | Hinks | |
| 2005/0091156 A1 | 4/2005 | Hailwood et al. | |
| 2005/0125696 A1 | 6/2005 | Afshar et al. | |
| 2005/0132086 A1 | 6/2005 | Flurry et al. | |
| 2005/0228984 A1 | 10/2005 | Edery et al. | |
| 2005/0249190 A1 | 11/2005 | Birch | |
| 2005/0249344 A1 | 11/2005 | Mueller et al. | |
| 2006/0014688 A1 | 1/2006 | Costa et al. | |
| 2006/0041669 A1 | 2/2006 | Bemmel et al. | |
| 2006/0116912 A1 | 6/2006 | Maes | |
| 2006/0117109 A1 | 6/2006 | Maes | |
| 2006/0143686 A1 | 6/2006 | Maes | |
| 2006/0165060 A1 | 7/2006 | Dua | |
| 2006/0178898 A1 | 8/2006 | Habibi | |
| 2006/0190600 A1 | 8/2006 | Blohm et al. | |
| 2006/0212574 A1 | 9/2006 | Maes | |
| 2006/0256774 A1 | 11/2006 | Rigaldies et al. | |
| 2006/0272028 A1 | 11/2006 | Maes | |
| 2006/0282856 A1 | 12/2006 | Errico et al. | |
| 2006/0291507 A1 | 12/2006 | Sarosi et al. | |
| 2007/0011322 A1 | 1/2007 | Moiso | |
| 2007/0061397 A1 | 3/2007 | Gregorat et al. | |
| 2007/0100831 A1 | 5/2007 | Cox | |
| 2007/0100981 A1 | 5/2007 | Adamczyk et al. | |
| 2007/0118618 A1 | 5/2007 | Kisel et al. | |
| 2007/0150480 A1 | 6/2007 | Hwang et al. | |
| 2007/0150936 A1 | 6/2007 | Maes | |
| 2007/0203841 A1 | 8/2007 | Maes | |
| 2007/0204017 A1 | 8/2007 | Maes | |
| 2007/0233883 A1 | 10/2007 | De Lutiis et al. | |
| 2007/0239866 A1 | 10/2007 | Cox et al. | |
| 2007/0271554 A1 | 11/2007 | Fletcher et al. | |
| 2007/0276907 A1 | 11/2007 | Maes | |
| 2007/0280226 A1 | 12/2007 | Sonalkar et al. | |
| 2007/0291859 A1 | 12/2007 | Maes | |
| 2008/0025243 A1 | 1/2008 | Corneille et al. | |
| 2008/0080479 A1 | 4/2008 | Maes | |
| 2008/0151918 A1 | 6/2008 | Foti | |
| 2008/0162637 A1 | 7/2008 | Adamczyk et al. | |
| 2008/0168523 A1 | 7/2008 | Ansari et al. | |
| 2008/0186845 A1 | 8/2008 | Maes | |
| 2008/0189401 A1 | 8/2008 | Maes | |
| 2008/0228919 A1 | 9/2008 | Doshi et al. | |
| 2008/0232567 A1 | 9/2008 | Maes | |
| 2008/0235230 A1 | 9/2008 | Maes | |
| 2008/0235327 A1 | 9/2008 | Maes et al. | |
| 2008/0235354 A1 | 9/2008 | Maes | |
| 2008/0235380 A1 | 9/2008 | Maes | |
| 2008/0288966 A1 | 11/2008 | Maes | |
| 2008/0301135 A1 | 12/2008 | Alves et al. | |
| 2008/0307108 A1 | 12/2008 | Yan et al. | |
| 2009/0006360 A1 | 1/2009 | Liao et al. | |
| 2009/0015433 A1 | 1/2009 | James et al. | |
| 2009/0034426 A1 | 2/2009 | Luft et al. | |
| 2009/0112875 A1 | 4/2009 | Maes | |
| 2009/0119303 A1 | 5/2009 | Rio et al. | |
| 2009/0125595 A1 | 5/2009 | Maes | |
| 2009/0132717 A1 | 5/2009 | Maes | |
| 2009/0187919 A1 | 7/2009 | Maes | |
| 2009/0193057 A1 | 7/2009 | Maes | |
| 2009/0193433 A1 | 7/2009 | Maes | |
| 2009/0201917 A1 | 8/2009 | Maes et al. | |
| 2009/0228584 A1 | 9/2009 | Maes et al. | |
| 2010/0049640 A1 | 2/2010 | Maes | |
| 2010/0049826 A1 | 2/2010 | Maes | |
| 2010/0058436 A1 | 3/2010 | Maes | |
| 2010/0077082 A1 | 3/2010 | Hession et al. | |

OTHER PUBLICATIONS

Maes, Stephanie, Multi-modal Browser Architecture, Overview on the support of multi-modal browsers in 3GPP, IBM Research Mobile Speech Solutions and Conversational Multi-modal Computing, downloaded http://www.w3.org on May 26, 2003, 25 pages.

Sundsted, Todd E., With Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

Single Sign on Deployment Guide, Introduction to Single-Sign-On, Netscape 6 Documentation Training Manual hhtp://developer.netscape.com/docs/manuals/security/SSO/sso.htm on May 26, 2003, 5 pages.

Liberty Architecture Overview, Liberty Alliance Project Version 1.1, Piscataway New Jersey, Jan. 15, 2003, 44 pages.

Parlay APIs 4.0, Parlay X Web Services White Paper, The Parley Group: Parlay X Working Group, Dec. 16, 2002, 12 pages.

U.S. Appl. No. 11/024,160, filed Dec. 2004, Maes.

Andrews, Tony et al, Business Process Execution Language for Web Services, Version 1.1, BEA Systems, International Business Machines Corporation, SAP AG, Siebel Systems, May 5, 2003, 31 pages.

Policy-Based Management Tom Sheldon's Linktionary, downloaded http://www.linktionary.com/policy.html on Aug. 2, 2004, 4 pages.

Seely, Scott, "XML and Web Services Security: Understanding WS-Security", Microsoft Corporation, 2002.

Simpson et al, Java Product Review—Oracle EDA Suite, Dec. 4, 2006, Open Source Magazine, pp. 1-10.

Thomas Manes, Anne, "Registering a Web Service in UDDI", 2003.

U.S. Appl. No. 11/848,347, filed Aug. 31, 2007, Advisory Action mailed Jul. 27, 2010, 3 pages.

U.S. Appl. No. 11/848,347, filed Aug. 31, 2007, Final Office Action mailed May 10, 2010, 15 pages.
U.S. Appl. No. 11/848,347, filed Aug. 31, 2007, Office Action mailed Oct. 29, 2009, 12 pages.
U.S. Appl. No. 11/877,129, filed Oct. 23, 2007, Advisory Action mailed Jun. 3, 2010, 2 pages.
U.S. Appl. No. 11/877,129, filed Oct. 23, 2007, Final Office Action mailed Mar. 29, 2010, 17 pages.
U.S. Appl. No. 11/877,129, filed Oct. 23, 2007, Notice of Allowance mailed Aug. 5, 2010, 6 pages.
U.S. Appl. No. 11/877,129, filed Oct. 23, 2007, Office Action mailed Sep. 28, 2009, 15 pages.
U.S. Appl. No. 11/926,738, filed Oct. 29, 2007, Final Office Action mailed Jun. 29, 2010, 12 pages.
U.S. Appl. No. 11/926,738, filed Oct. 29, 2007, Office Action mailed Feb. 24, 2010, 12 pages.
U.S. Appl. No. 11/943,101, filed Nov. 20, 2007, Advisory Action mailed Apr. 16, 2010, 3 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Office Action mailed Jul. 8, 2009, 9 pages.
U.S. Appl. No. 11/951,500, filed Dec. 6, 2007, Advisory Action mailed Jun. 24, 2010, 2 pages.
U.S. Appl. No. 11/951,500, filed Dec. 6, 2007, Final Office Action mailed Mar. 30, 2010, 26 pages.
U.S. Appl. No. 11/951,500, filed Dec. 6, 2007, Office Action mailed Sep. 22, 2009, 24 pages.
U.S. Appl. No. 12/019,299, filed Jan. 24, 2008, Office Action mailed Mar. 31, 2010, 13 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 10/855,999, filed May 28, 2004, Office Action dated Jun. 24, 2010, 20 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 11/024,160, filed Dec. 27, 2004, Office Action dated Aug. 22, 2008, 8 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Office Action dated Jun. 9, 2010, 10 pages.
U.S. Appl. No. 11/123,468, filed May 5, 2005, Office Action dated Apr. 10, 2009, 17 pages.
U.S. Appl. No. 11/123,468, filed May 5, 2005, Final Office Action dated Nov. 24, 2009, 19 pages.
U.S. Appl. No. 11/123,468, filed May 5, 2005, Advisory Action dated Feb. 17, 2010, 3 pages.
U.S. Appl. No. 11/123,468, filed May 5, 2005, Office Action dated Apr. 14, 2010, 16 pages.
U.S. Appl. No. 11/123,471, filed May 5, 2005, Office Action dated Jan. 23, 2009, 8 pages.
U.S. Appl. No. 11/123,471, filed May 5, 2005, Notice of Allowance dated Jun. 29, 2009, 6 pages.

* cited by examiner

METHOD AND APPARATUS FOR SUPPORTING SERVICE ENABLERS VIA SERVICE REQUEST COMPOSITION

CROSS-REFERENCES TO RELATED APPLICATIONS

This application claims the benefit of U.S. Provisional Application No. 60/483,592 entitled "Method and Apparatus for Supporting Service Enablers via Service Request Composition", filed Jun. 27, 2003, which is incorporated herein by reference.

BACKGROUND OF THE INVENTION

The present invention generally relates to web services. More particularly, the present invention relates to supporting requests for web services by composing additional supporting requests for web services.

Different approaches have been introduced to specify guidelines for interoperability of services and service enablers. Such approaches have included Web Services, java beans, portlets, CORBA/IIOP (Internet Inter-Orb Protocol), and others. These approaches require that developers specifically provide particular function calls for services and service enablers. Further, these approaches require the developers to create and support virtually all of the additional services ("support functions") for such services. Because of this, there is often little incentive for developers to develop supporting functions that could be used by other developers. Accordingly, few, if any, situations are envisioned where services and service enablers from independently developed providers can be used together at run-time.

Current approaches to interoperability include Parlay, and Web Service technologies including WSFL (Web Service Flow Language), WSXL (Web Service Experience Language), UDDI (Universal Description Discovery and Integration), OASIS WS inspection, OASIS WS-Security, WS-Provisioning, SLA (service level agreements), Liberty from the Liberty Alliance Project, and others. These approaches specify guidelines for supporting functions, however they do not specify any mechanism on how supporting functions can systematically be used or enforced. More particularly, the inventor of the present invention has determined that these services do not contemplate independent service function composition, combination, aggregation, or coordination in any way that would allow a service provider to control and manage efficiently the way that it exposes its enablers or services to other parties in automatable ways, where the requestor can determine the conditions that it must satisfy to access and use the enabler or the services and can satisfy them. Further, the existing services do not contemplate the service provider validating that these conditions as well as any additional conditions internally imposed and not exposed to the requestor, have been satisfied. The inventor has determined that typically, such conditions amount to specifying what are the supporting functions that must be called, for example for authentication, authorization, charging, or logging—only authentication is exposed and the conditions presented to the requestor allow the requester to provide the appropriate credential (e.g. user ID and password or digital certificate). Further it allows the requester to provide the credentials in the right format (e.g. digital certificate, compression). These conditions will be referred to herein as execution policies.

As an example, the Parlay framework specifies a centralized framework for discovering and supporting service enablers. Upon authentication of a requestor, a service enabler is instantiated and made available to the requester. However, the framework was developed prior to and independently from web services and therefore it does not, for example, cater for providing the Parlay framework functionality to generic web services. The Parlay framework is fundamentally a session-based approach where services are instantiated upon request and then protected by hiding its address for the duration of the instantiation. This, and a Corba architecture, are not a recommended solution for distributed deployment across different domains. Further, Parlay requires skilled developers to use an IIOP framework or a CORBA architecture (even when on top of HTTP or using SOAP) and develop appropriate interfaces for each service enabler or service. Composing such interfaces is not simple, thus the adoption of this approach for determining the availability and the enforceability of supporting functions is limited.

Additionally, the Parlay framework does not appear conducive to distribute deployments over a network, such as the public internet, based on Web Services. More specifically, the Parlay Web Services Framework (authentication, authorization and SLA (Service Level Agreement)) is based upon instantiation of known services, and not upon discovery and use of new enablers or services.

In light of the above, what is desired is a new common framework without the drawbacks described above.

BRIEF SUMMARY OF THE INVENTION

Embodiments of the present invention relate to services, such as web services. More particularly, the embodiments relate to supporting requests for web services managing the composition of additional supporting requests for web services. Further, the present invention relates to a new framework for managed exposure of mobile service enablers that relies on supporting functions. The provided embodiment is interoperable with web service security, provisioning, and other identity management schemes.

A significant feature of embodiments of this invention is to allow managed and controlled exposure of enablers or services in ways that can be discoverable or communicatable to others and in ways that can be described to the requestor. This process may be in advance of when a business relationship is established, via side channel, or at discovery if the provider allows the requester to discover the service. This exposure typically discloses what conditions that must be satisfied and it allows the provider to enforce that these conditions and any additional conditions desired.

The inventor believes embodiments of the inventions described herein would be desirable by present day telecommunications companies (telcos) and Wireless service enablers, so they can expand beyond being mere data pipes. More specifically, it is believed such providers could greatly benefit by implementing business models that provide controlled ways to expose their enabler and access to their network, enablers and services. In the future, other entities besides telcos, or service enablers are expected to use embodiments of the present invention.

Additionally, the inventor believes the inventions described herein would be desirable by enterprises and third party service enablers. More specifically, it is believed that such parties desire access to networks, enablers and service that are provided by numerous service enablers, but want such access to be automated. The embodiments of the present invention provides such parties automatic discovery of conditions to satisfy.

Significant features of embodiments of the present invention include that a provider can easily 1) manage (check, debug, test, update, change, . . . ) the execution policies that must be enforced, and 2) deploy them across its domain for existing or new enablers or services.

According to an aspect of the invention, a computer system is described to include a composition enabler configured to enforce an execution policy associated with a responder in response to a request from a requester, configured to send the request to the responder, and configured to compose a response with a function from the group: a function that must be executed before the request reaches the responder, a function that must be executed after a response from the responder.

According to another aspect of the invention, a method for a computer system is described. In one technique, the method includes receiving a request for a first service from a requestor, and determining an enabler policy associated with the first service, wherein the enabler policy specifies a plurality of services, a plurality of respective service enablers, and a service order. In other methods may include composing a plurality of service requests for the plurality of service enablers in response to the plurality of services and the plurality of respective service enablers specified, and providing the plurality of service requests, a specification of the plurality of respective service enablers and the service order to the requestor.

According to yet another embodiment, a computer system is described to include a requestor configured to send a request for a service to a discovery service, and configured to select a target enabler for the service, and the discovery service configured to redirect the selection from the requestor of the target enabler to the a composing enabler. Additionally, the computer system may include the composing enabler configured to receive a policy from a target enabler associated with the target enabler, wherein the composing enabler is also configured to compose a service request to a service that must be performed before a request to the target enabler is provided, and configured to provide the composed service request to the requestor.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The following definitions are used herein.

Conditions are called execution policies and they are defined as: Execution Policies: The expression of a set of conditions that must be enforced (executed and validated) on any request or exchange that takes place. These conditions involve policy assertions and logic expression between policy assertions.

Policy assertions: An individual preference, requirement, capability or other property that can be evaluated or executed.

Policies: A definite goal, course or method of action to guide and determine present and future decisions. "Policies" are implemented or executed within a particular context. Such a rule is supposed to be used for receiving a set of parameters and producing a result. A static policy is a particular case of policy assertions that must be evaluated.

Policy Workflows: The expression of a series of assertions that must be executed. Workflows are particular cases of execution policies where the logic expressions describe sequences in which assertions must be executed.

Figure 1:
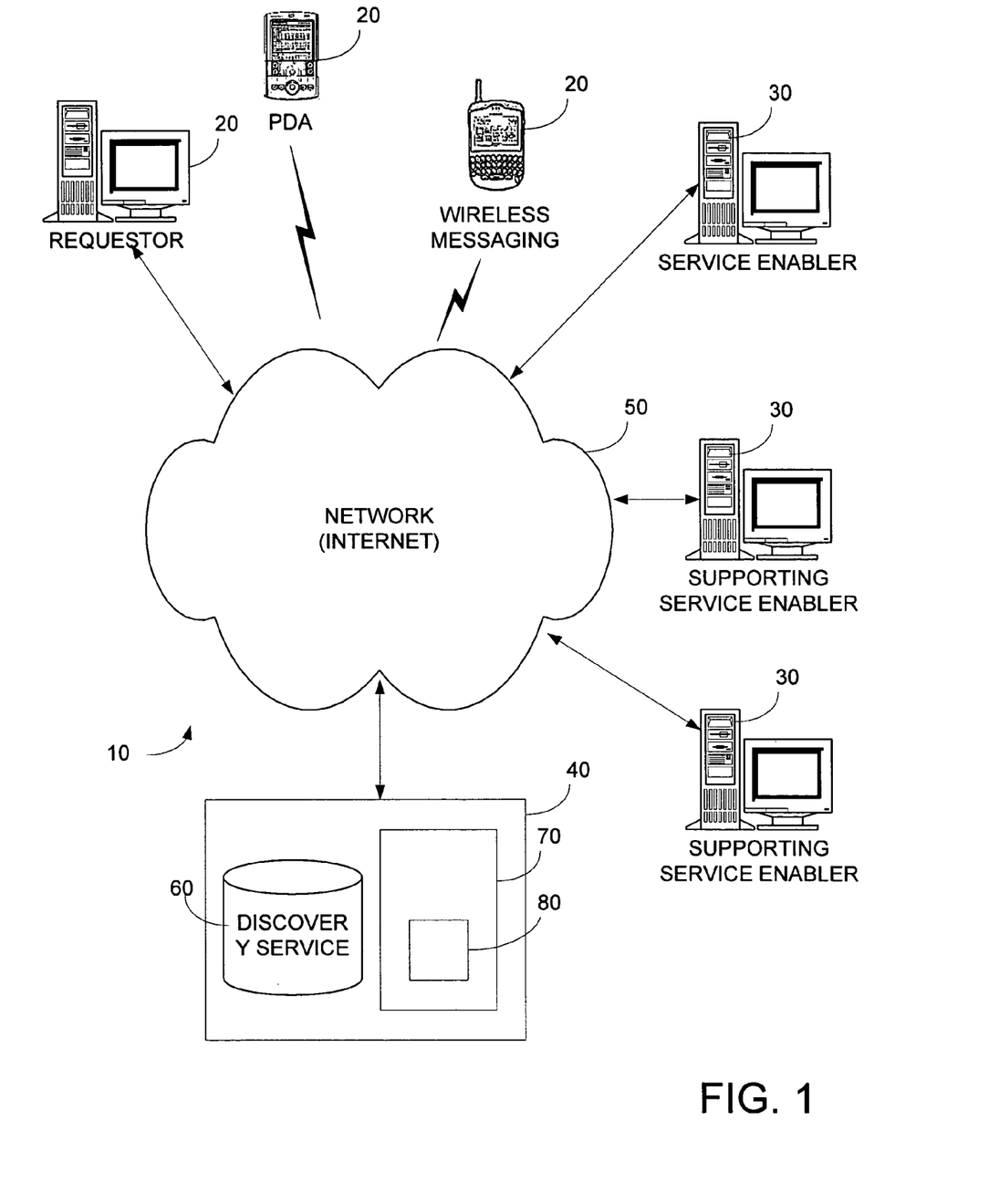
FIG. 1 illustrates an overview diagram of an embodiment of the present invention.

FIG. 1 illustrates an overview diagram of an embodiment of the present invention. In FIG. 1, a network 10 is illustrated including a number of requesters 20, a number of service enablers 30, and a composing system 40. Requestors 20, service enablers 30, and composing system 40 may be coupled via a network 50 either via cables, wires and/or wirelessly.

In one embodiment, network 50 may be a wide-area-network such as the Internet, whereas in another embodiment, network may be any other network, such as a virtual private network, a local area network, or the like.

In the present embodiment, requesters 20 is a user/device that submits a request. For example, requestor 20 may be a service provider, an application provided by an application provider or an enterprise, or the like. In wireless embodiments, requestor 20 may be a user using a conventional wireless device, such as a PDA, a mobile telephone, a wireless e-mail device (e.g. a "blackberry"), a pager, or the like. In other embodiments, requesters 20 may be include devices including laptop computers or desktop computers coupled wireless to network 50.

As will be described further below, in one embodiment, service enablers 30 typically provide services to requesters 20. In one example, services may be web services. As examples, service enablers 30 may enable services such as user authentication services, user authorization services, user accounting and billing services, user personalization services, and the like.

In this embodiment, service enablers 30 may be embodied as a traditional web server coupled via wires to network 50. In other embodiments of the present invention, service enablers 30 may be embodied as any system that provides services to requesters 20.

In the present embodiment, composing system 40 includes two portions, a discovery portion 60 and a composition enabler portion 70. As will be discussed further below, discover portion 60 provides requestors 20 selections of services that are enabled by composing system 40. In this example, composition enabler portion 70 includes a listing of policies desired or required to be executed when accessing services/enablers listed in discovery portion 60. Additionally, composition enabler portion 70 includes a composition enabler engine 80 that composes services specified by the respective policies.

In the present embodiments, the discovery step should be generally be treated similar to the way it is done in the industry for Web Services: first the service provider registers its enabler/service with its policy, next, the requestor can discover enablers, when the requester discovers what they receive is a composed enabler that enforces the policies. In various embodiments, the discovery step can be done in many different ways, including: automatically (e.g. using UDDI) or out of band because the address, interface and associated relevant policy assertions have been passed in another channel (e.g. including in a paper document). An important element is that whatever is passed is the composed enabler that matches the policies.

Figure 2:
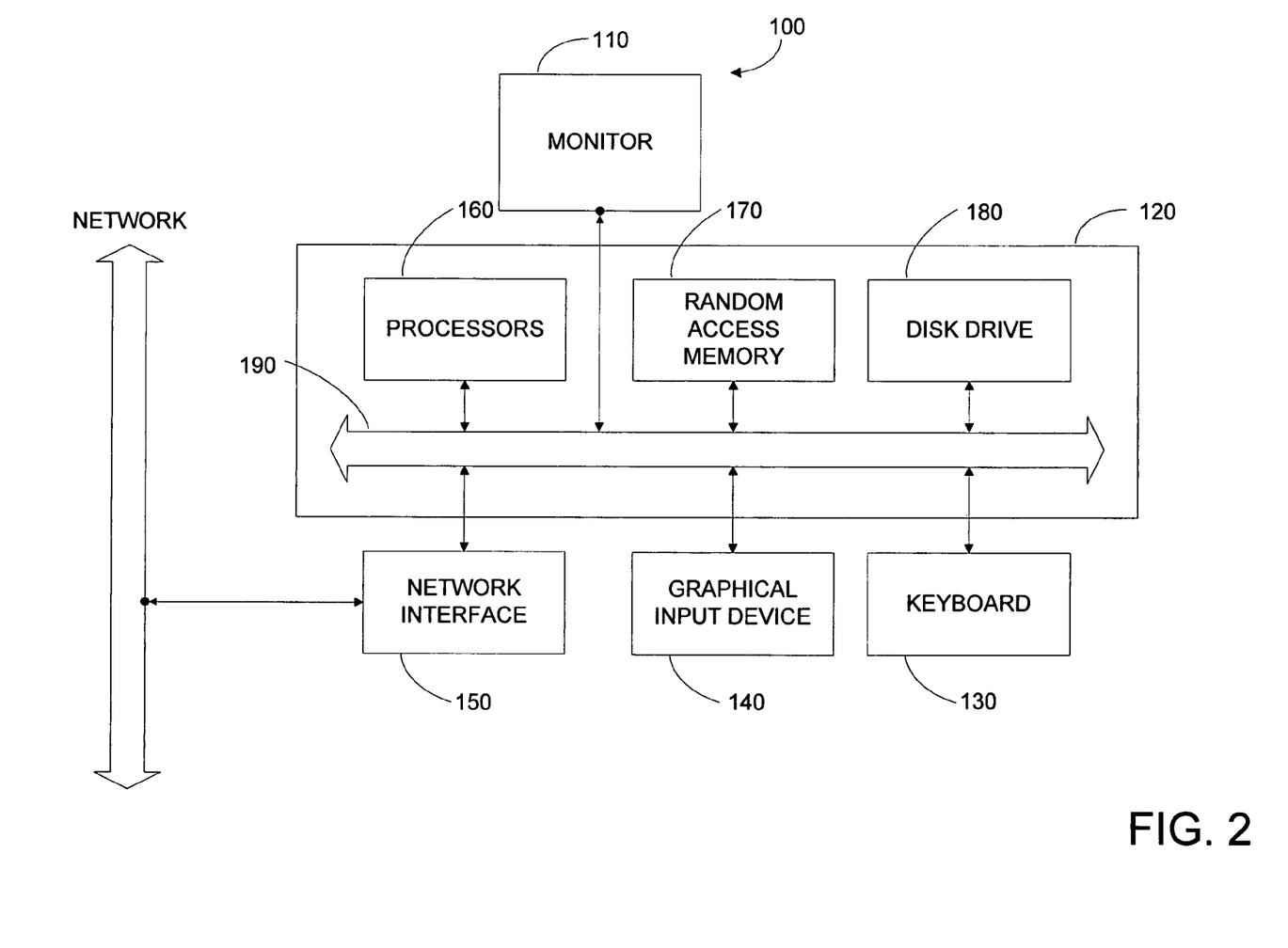
FIG. 2 is a block diagram of a system according to an embodiment of the present invention.

FIG. 2 is a block diagram of typical requestor 20 according to an embodiment of the present invention. In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of data, including computer programs, applet interpreters or compilers, virtual machines, embodiments of the herein described invention including service policies, a composition enabler engine, a specification of web services supported, and respective service enablers, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 2 is representative of computer rendering systems capable of embodying the present invention. It will be readily apparent to one of ordinary skill in the art that many other hardware and software configurations are suitable for use with the present invention. For example, the use of other micro processors are contemplated, such as Pentium™ or Itanium™ microprocessors; Opteron™ or AthlonXP™ microprocessors from Advanced Micro Devices, Inc; PowerPC G3™, G4™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

In one embodiment, computer system 100 includes a computer program that is possible part of another application, that allows computer system 100 to serves as a requestor.

Figure 3A:
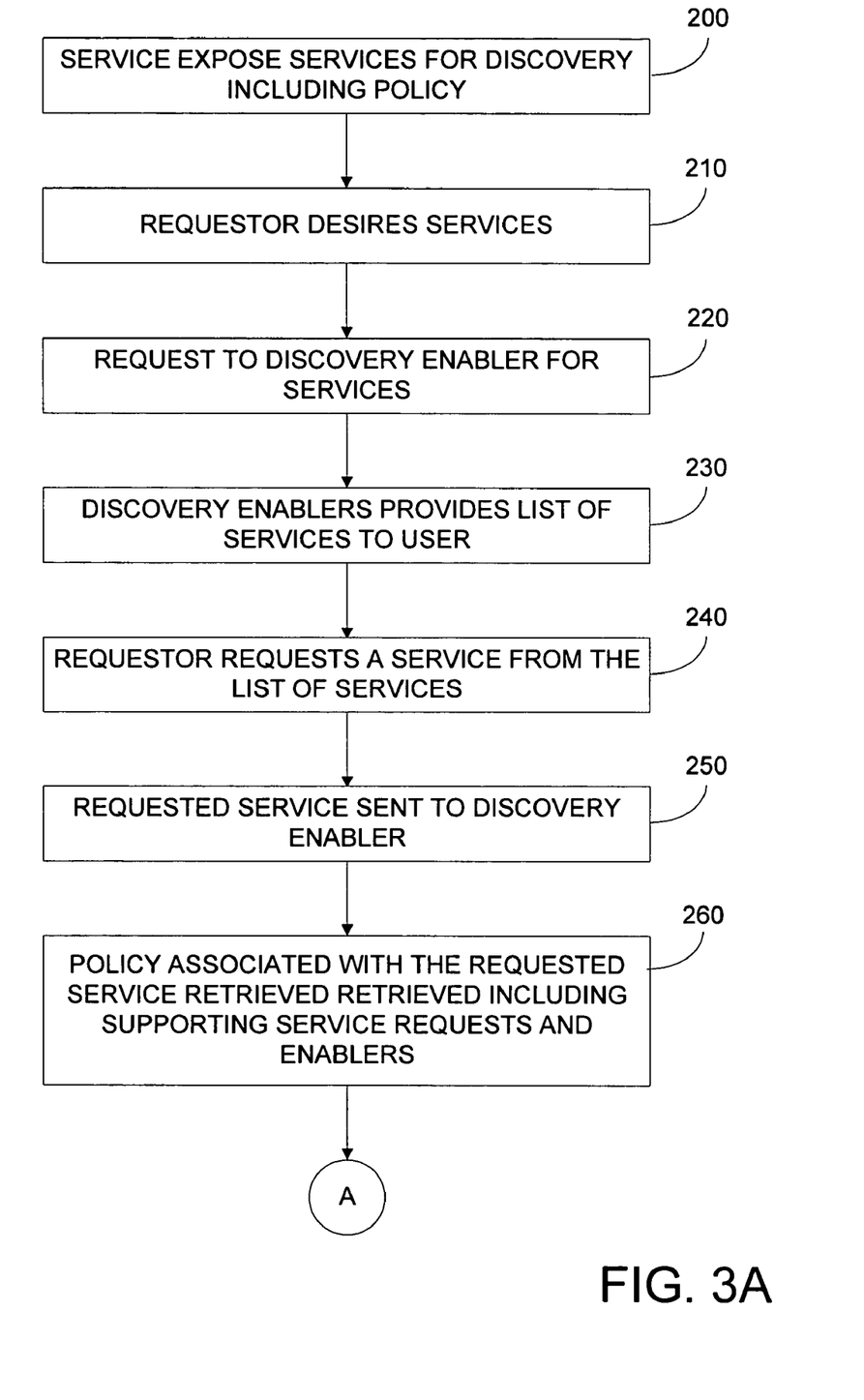
FIGS. 3A-3C illustrates a block diagram of a process according to an embodiment of the present invention.
Figure 3B:
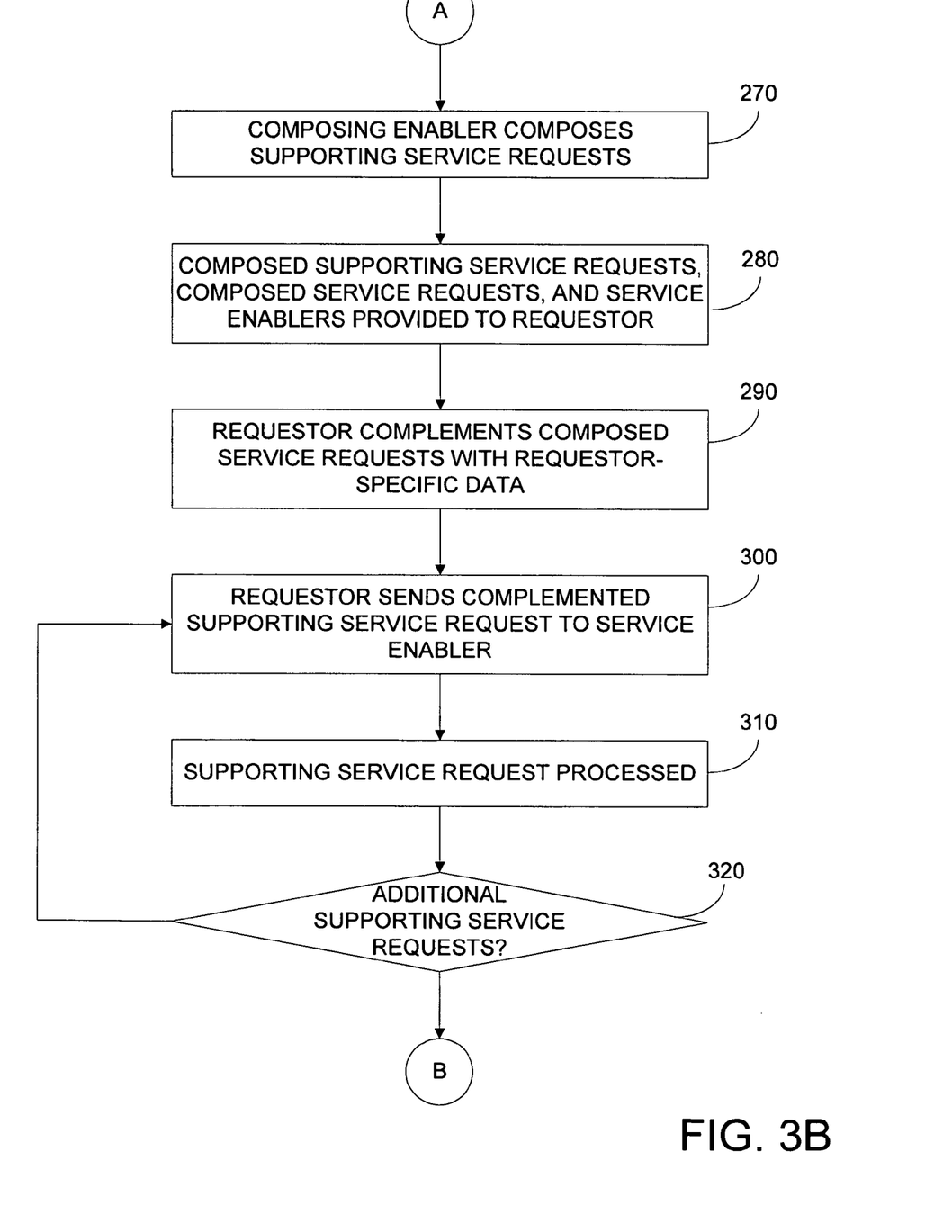
Figure 3C:
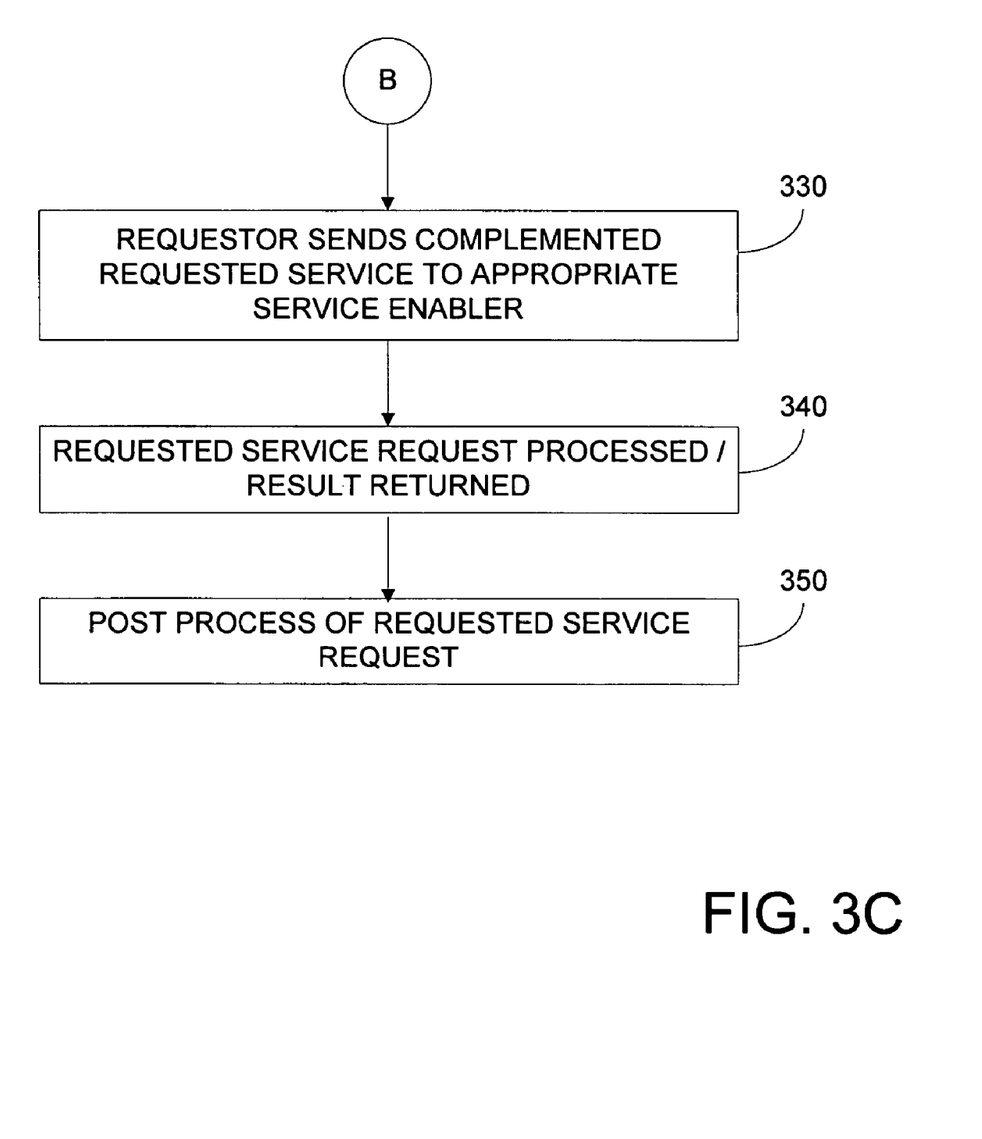

FIGS. 3A-3C illustrates a block diagram of a process according to an embodiment of the present invention.

In the present embodiment, a service provider has decided to expose a service or an enabler for requesters to user. When deciding to expose the service or enabler, the service provider decides that some execution policies/enabler policies must be enforced. To do so, a service policy is associated with the description of the enabler and that service policy is registered for discovery, step 210. In the present embodiment, the policies that are put up for discovery are the policies that the composed enabler/service that enforces as a sequence or requests to supporting functions or other enablers.

In various embodiments, the service provider may also later update these policies as a new composition that reflects the policy updates. In other embodiments, the details of the exposed service or enabler are accessed via a third party rather than putting it up for discovery. The third party may be specified by the service provider communicating the details (interface, address, policy assertions) that pertains to the resulting composed enabler.

Next, in the present embodiment, a requester 20 (e.g. a service, application or enabler located within or outside the service provider domain—including possibly as code on a wireless device interacted with by a user) may be interested in what services are available, step 210. In response, the requestor 20 requests a discovery service from a discovery enabler from wireless device 20, step 220. In various embodiments, this may be an automated process where by the software code can make the discovery, select a service and pursue. It may also be a software step, followed by inspection by a human operative at the requestor side (e.g. third party service provider/enterprise) that selects the service and binds to it. In one example, the requestor sends a request to discovery portion 60 via network 50 for a list of services that are available. In response, discovery portion 60 may provide a list of one or more services from one or more service providers that the requestor can select, step 230. As an example, the requestor may see a list of service providers that can provide the wireless user with her present geographic location. In other embodiments, wireless device 20 may automatically query discovery portion 60 for available services. The above illustrates one particular way to implement discovery, however, many other ways can be implemented in light of the present patent disclosure.

From the list, the requestor selects a service from one of the providers, step 240. This may be done manually or automatically. In the present embodiment, the request for the selected service is then returned to discovery portion 60, via network 50, step 250. Using the example above, the requestor may select service provider A to provide the geographic user location service. In other embodiments, requestor 20 may select the appropriate service provider based upon pre-determined criteria (e.g. user preference, wireless service provider affiliate, "trusted" provider, lowest cost, and the like. The selected service provider may also be termed a responder.

In this embodiment, discovery portion 60 passes the request for the service to composition enabler portion 70. In response to the request, composition enabler portion 70 retrieves a "policy" associated with the service request, step 260. In embodiments of the present invention, composition enabler portion 70 may compose on-the-fly, or may compose in advance of an actual service request.

In the present embodiment, the "policy" includes a list of supporting services that should be enforced (executed and validated) on a request to the original service/enabler (this is typically done by returning the composed enabler/service) and some policy assertions that the requestor must be aware of (i.e. some meta-data that qualifies what the requestor must pass and how with the request (e.g. credentials as discussed earlier). Continuing the example above, before the requester is provided with the geographic user location from service provider A, the policy may indicate that service provider A requires authorization and then payment for the requested services. In such an example, the supporting services first includes an authentication/authorization step. for example: can the requester access that information—did the target user accept to have his location information divulgated to that service provider etc? Second, the supporting services may include, a payment service and a payment enabler. For example, the requested service may be a subscription service and enabler, such as a music download service. In such a case, before the requestor is provided the music download, the policy may indicate that a service provider requires the requestor to provide a valid subscriber name and password combination to a subscription service enabler.

Many other types of supported services are contemplated in other embodiments of the present invention, such as user authentication functions, user authorization services (including single sign-on), accounting functions (e.g. rates, billing data, charging data), personalization services (e.g. user device identification, application settings and data, user privacy restrictions, usage), session management functions, channel management functions, multiple-device/multimodal access functions, system management, administration, and control functions, service registration functions, additional service discovery functions, messaging functions, application level functions (e.g. voice and multimedia routing), secure mechanism functions (e.g. trust management functions, secure exchanges, integrity certifications), common naming functions, discovery functions, and the like. It is believed that one of ordinary skill in the art would be able to implement such embodiments in light of the present invention. It is also possible that particular enablers or services developed by the service provider are required to be executed on particular requests. The embodiments of the present invention allow for imposing calling such new components (by indicating the need for such a call in the policy and by enforcing the call in the composed enabler).

Embodiments of the present invention thus provides a framework that enables service level agreements (e.g. by allowing after signing a SLA to add a requestor to the lest of authenticated (known) and authorized requestor of a service and deciding for example how the requestor will be charged for using the service (per request, flat rate, . . . ); identity management (e.g. the credentials and claims can be passed to an authentication functions that is able to interacts with the appropriate identity management system if needed (e.g. single sign on, identity federation, . . . ), trust management (e.g. within the composed enabler, request reach the target initial enabler/services, only if authenticated and authorized as specified by the policies), user mobility (e.g. authorization and access to enabler present in other domains is now very simple and a direct function of the fact that the invention allow automated discovery and request to enabler present in other domains e.g. in the domain of another MNO (mobile network operator) so that a MNO can authenticate and expose a service offered by another MNO when the user roams etc. . . . ) and roaming functions. Additional services may include secure data exchanges (e.g. confidentiality, integrity protection, signature/digital certificates—e.g. the exchanges may be appropriately encrypted within the composed enabler), system management (e.g. load balancing, request routing, monitoring, fault detection—e.g. built in the system that deploys/implements the composed enabler), system provisioning (e.g. terminal enablers, network enablers, server enablers—authorized requestor can now access a provisioning enabler that service provider can expose in a controlled and automatable manner), and the like. In embodiments of the present invention, combinations of the above supporting services is contemplated.

In the present embodiment, in response to the policy, composition engine 80 composes requests for the supporting services for the respective service enablers, step 270. In particular, for each supporting service listed in the policy, composition engine 80 composes requests for the supporting services in the manner expected by the respective service enabler. Continuing the examples above, composition engine 80 may compose a service request to a payment enabler, or composition engine 80 may compose a service request to a subscription service enabler.

Typically in addition service requests for the supporting services, composition engine 80 also composes a service request for the originally requested service. In the example above, this would be a composed service request to service provider A.

It is contemplated that supporting services may be provided by different service enablers within a single policy, thus, composition engine 80 composes unique supporting service requests to the respective service enablers. For instance, a first service enabler may be for a service enabler operated by a financial institution, and a second service enabler may be for a service enabler of a single sign-on provider, etc. Further, the financial institution may implement their services in a completely different way from the single sign-on provider. Accordingly, composition engine 80 would generate the composed service requests in the appropriate manner required to communicate with the financial institution and the appropriate manner required to communicate with the single sign-on provider, and the like.

In the present embodiment, the composed requests, and identifiers of the respective service enablers are passed back to requestor 20, step 280. In examples of the present invention, the composed requests may be related to user authentication, authorization, encryption/decryption, integrity validation, integrity certification, charging events, message optimizations, user/session/device/access management, routing, and the like. In one embodiment, the returned list includes already composed service enablers according to their policies. The composition may depend on who is the requestor (as the discovery of the enabler may itself include in its policy and authentication/authorization, and policies of an enabler can specify what data is passed to which destination.)

In embodiments of the present invention, steps 220-280 may be combined so that the requestor receives one composed enabler, or a list of service enablers to select. In such embodiments, the composition may be done in advance, such as when the service where registered with the directory or when policies were loaded or updated, or when the request was done. The ordering of these steps is thus flexible. The selection of the service based on the discovery may be done automatically or manually by the requestor and the directory may be structured such that the discovered services are already the composed services or high level service class that returns the specific details for the selected service.

In the present embodiment, the policy also includes a defined order for the supporting functions, that is, an order in which the supporting functions must be requested. In other embodiments, the policy may include a desired order for the supporting functions, i.e., an order for requesting supporting functions that may be requested or completed before other functions. In one embodiment, some supporting functions should be requested and/or completed before the user selected service, and some supporting functions should be requested after the user selected service is requested and/or completed. In embodiments of the present invention, the policy may also include the meta-data/policy assertions that inform the requestor on what/how to communicate required information to the composed service (e.g. what kind of digital certificate). An example of this is given later below.

In this embodiment, requestor 20 may then complement the received composed service requests with the necessary requestor data, step 290. Continuing the example, above, if a policy specifies that payment services are required, a composed service request for a particular amount of money to a credit-card service enabler is received by wireless device 20. The request may also include the user ID and password. In response, requester 20 may complement the composed request by inserting the user's credit card number, the user's name, the user's address, and other user data into the composed request. As another example, if a policy specifies that a subscription services are required, a composed service request to a subscription enabler may be received by requestor 20. In response, requester 20 may complement the composed request by inserting the requestor's name, requestor's password, and other requestor's data. It is contemplated that not all composed service requests may require complementing.

In other embodiments of the present invention, complementing data may be derived from third-party data sources, such as Microsoft Passport™, and others (e.g. an authentication received after a previous authentication/authorization step). In such a case, requestor 20 may request data from a third-party data source, and once the data is returned, requestor 20 may complement the composed requests. In other embodiments, the third-party data sources may complement the composed requests.

Next, according to the defined order set forth by the policy, a composed (complemented, if necessary) service request is sent from requestor 20 to the respective service enabler, step 300. Referring back to FIG. 1, wireless device 20 sends the composed and complemented service request to a service provider 30. In the geographic user location example above, requestor 20 may send a service request to a credit card company that have embedded the credit card number, address, and an amount and the like.

In the present embodiment, the service enabler may return data to requestor 20 upon completion of the requested service, step 310. For example, a credit card company service enabler may return an "OK" message to requestor 20 to indicate that the charge was approved, or the like; in another example, a subscription service enabler may return a "subscribed" message to requestor 20 to indicate that the user is subscribed to a music service; and the like.

In the present embodiment, if the policy requires additional supporting service before the originally requested service, step 320, the process above repeats for the other pre-requisite supporting services (e.g. authentication, authorization, charging, decryption and integrity check). Otherwise (or after validated successful execution of all the execution policy steps), the composed (and complemented, if necessary) original service request is provided to the appropriate service enabler, step 330. Referring to the example above, the policy may specify that only if the billing services have been completed, is the geographic user location service request processed. In this example, in the case where the billing was approved, service provider A can provide the approximate street address of the user (for example, based upon wireless device cell, or the like). In one embodiment, steps 300-330 may be performed in one step.

In this embodiment, additional composed service requests may be performed after the original service request was processed, according to the policy, step 340. In particular, the return data provided by the original service request enabler may be further processed, step 350. For instance, the return data may be encrypted, the data may be filtered, or the like. In the example above, the requestor location may include a telephone number associated with the street address. In such a case, the telephone number may be filtered-out for privacy or security reasons. Conceptually, a response to the requestor may also be considered a new exchange where the responder is now the requester, and the original requestor is then the responder.

Figure 4A:
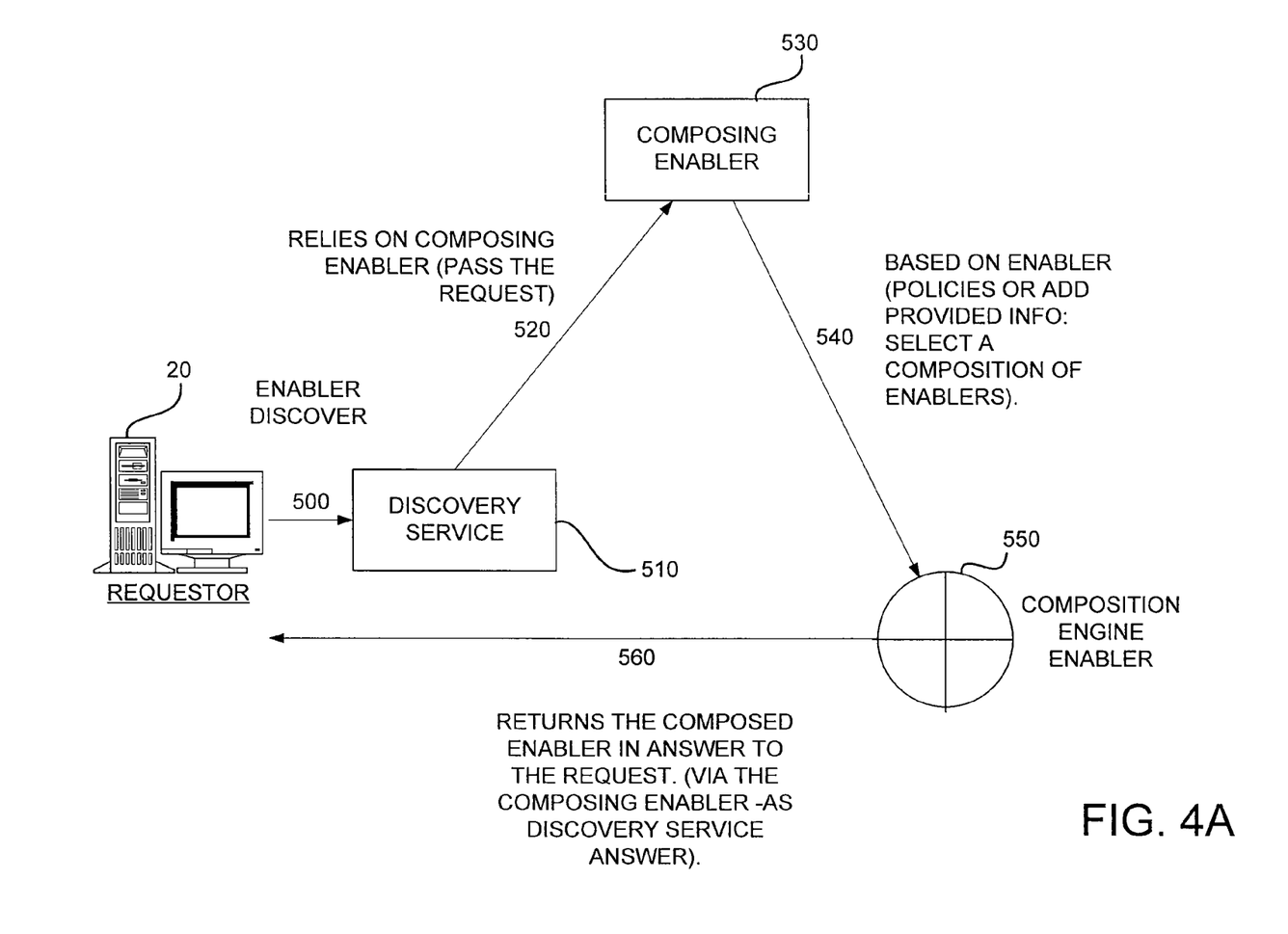
FIGS. 4A-4B illustrate a logical flow diagram according to an embodiment of the present invention.
Figure 4B:
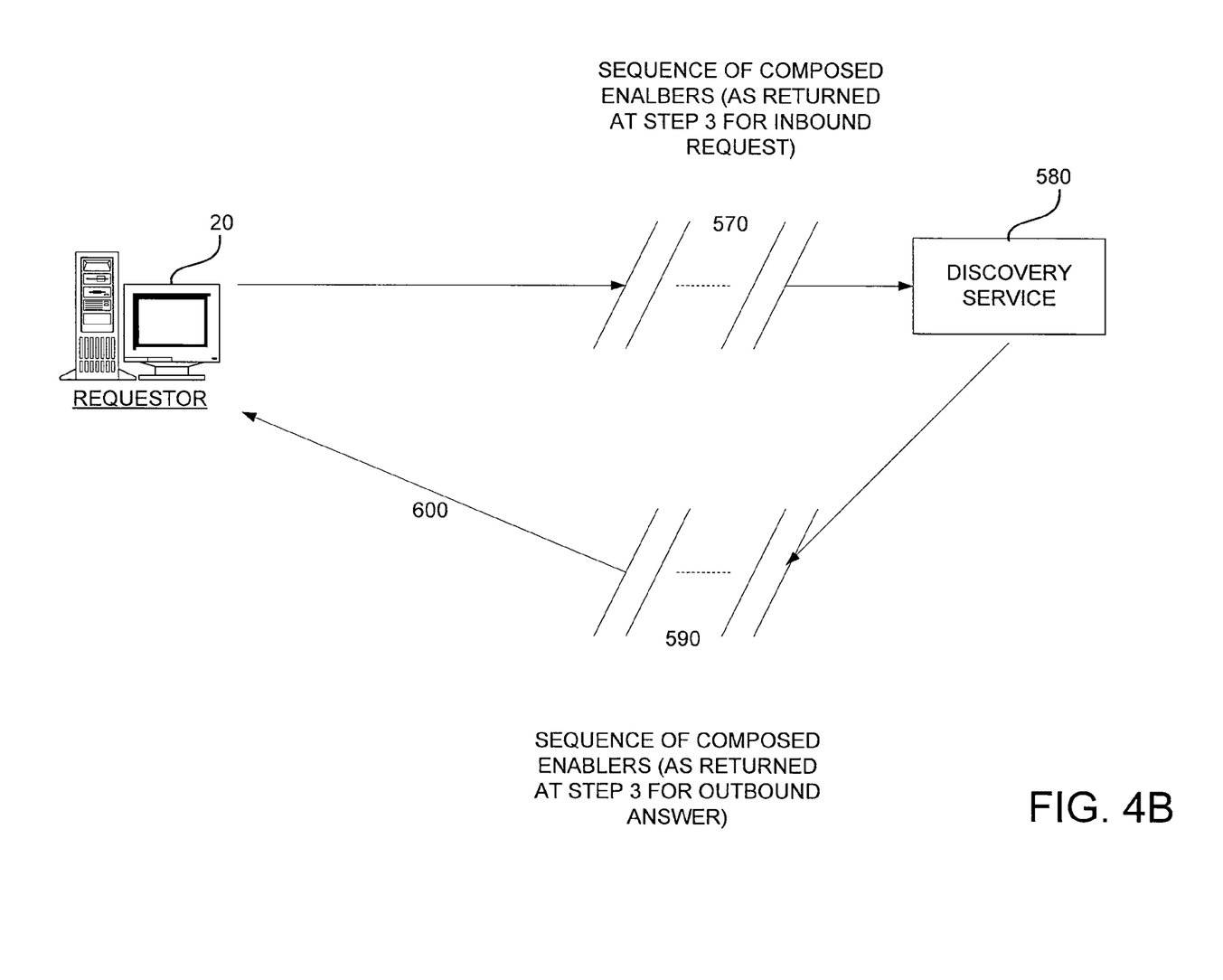

FIGS. 4A-4B illustrate a logical flow diagram according to an embodiment of the present invention. In FIG. 4A, requestor 20 makes a service request 500 to a discovery repository or enabler 510. In response, discover enabler 510 passes the request 520 to composing enabler 530. As described above, composing enabler 530 stores a policy associated with service request 500. The policy describes supporting functions (supporting services) and supporting service enablers, in addition to the requested service and service enabler. In this example, composing enabler 530 sends the policy data 540 to composition engine enabler 550. In turn composition engine enabler composes the series of supporting service requests. The composed supporting service requests and respective enablers are then returned 560 to requestor 20.

In FIG. 4B, in response to the composed supporting service requests, requestor 20 may complement these requests, if necessary. Next, requestor 20 sends the composed supporting service requests to the respective supporting service enablers 570. As illustrated in FIG. 4B, a series of prerequisite supporting services may be performed before services from the requested enabler 580 is provided. As disclosed above, any number of supporting services may be requested, such as user identification, authentication, payment schemes, and the like. After the request service is performed by requested enabler 580, any number of subsequent supporting services may be performed by respective supporting service enablers 590. For example, privacy filters, different level of service filters, and the like may be applied to the results, or otherwise. The results 600 are then returned to requestor 20.

In the foregoing specification, the invention has been described with reference to specific exemplary embodiments thereof. For example, the way that discovery is done, the use of Web Services, and the like. As stated the discovery can be done in advance or out of band. All these embodiments are also contemplated in light of the present invention disclosure. Many changes or modifications are readily envisioned. For example, composition engine 80 requests data for requester 20 step by step and completes the service requests. Engine 80 then provides the complemented service requests to the appropriate service enablers. In this embodiment, requestor 20 merely provides the requested complementing data to engine 80, but does not have to complete the composed service requests or output the requests to service providers.

In an example, have a dialog that is established between the different enablers that are part of the composed enablers that prompts the requestor instead of having the requestor providing all the info with the initial request. It is for example a way to circumvent having to pass any policy assertions to the requestor with the descriptor of the interface of the composed enabler and address (the latter should be passed).

Additionally, in various embodiments, The policies can be introduced via a specific schema (e.g. a declarative document) that binds to the different fields of the interface descriptor; or via an interactive tool that allows to visualize and update/enter the policy and steps that must be satisfied.

In another embodiment, engine 80 provides, per the policy, one request to requester 20 to complement at a time. Once requestor 20 complements a first request and transmits the request to a service enabler, engine 80 proves requestor 20 with a next composed service request. In this embodiment, requestor 20 would not need to support the policy.

In embodiments of the present invention, the inventors have determined that advantages of the present schema may be applied to teleco and wireless domains. However, it is envisioned that the teachings herein may be applied to any distributed web services framework or any framework where services/enablers are exposed by service providers. Accordingly, the concepts disclosed above are extremely valuable in a variety of applications. Embodiments may be implemented on virtually any technology or platform, and implemented in a variety of mechanisms, such as declarative (e.g. Web Services), imperative (e.g. procedural, java, scripts), scripted, or the like.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, deletion of blocks and the like are contemplated in alternative embodiments of the present invention. These components/systems can be distributed in networks within same domain or across domains. Multiple such systems can be combined at will as long that the principle of enforcing a policy by composing the target responder to contain the specs specified in the policy is respected.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for enforcing execution policies for target functions, comprising:
   a processor; and
   a memory device including instructions that, when executed by the processor, cause the processor to:
   receive a request from a requestor for a target function;
   determine a list of providers being configured to provide the requested first target function;
   determine an execution policy for the request, the execution policy specifying at least one supporting function for the request, and logic for combining each supporting function, such that the specified supporting functions and respective other functions are discoverable by the requestor;
   dynamically composing, by a composing enabler, a plurality of function requests for each of the specified supporting functions and respective other functions;
   selecting one of the providers from the list of providers to provide the requested first function;
   binding, by the composing enable, the first function with the specified plurality of supporting functions and the plurality of respective other functions;
   generate at least one composed request corresponding to a logic of at least one request for the specified at least one supporting function and sending the composed request to the at least one corresponding supporting function;
   enable each supporting function to execute and return responses that are composed as a composed response; and
   if all supporting functions are satisfied according to the logic of the composed request, pass an intended service request to the target function and pass a response from the target function back to the requestor,
   wherein the execution policy is able to specify that a composition of at least one of the supporting functions is executed after the response from the target function is generated.

2. The system of claim 1 wherein the request to the target function includes information about the requestor, and the instructions, when executed by the processor, further cause the processor to send to the requestor a list of discoverable services.

3. The system of claim 1 enabled to further register a list of discoverable services resulting from the compositions executed by the execution policies.

4. The system of claim 3 wherein the discovery data includes an interface description and an address.

5. The system of claim 3 wherein the discovery data includes meta-data that describes how a requestor should address a composition of functions that the execution policies generate when the requestor tries sending a request to a selected target function.

6. The system of claim 1 wherein the requestor prompts for additional data when required by the logic for combining each supporting function.

7. A method for enforcing execution policies for target functions, comprising:
   receiving a request for a first target function from a requestor;
   determining a list of providers being configured to provide the requested first target function,
   determining an execution policy associated with the first target function, the execution policy specifying a plurality of supporting functions, a plurality of respective other functions, and a composition logic, such that the specified supporting functions and respective other functions are discoverable by the requestor;
   dynamically composing, by a composing enabler, a plurality of function requests for each of the specified supporting functions and respective other functions;
   selecting one of the providers from the list of providers to provide the requested first function;
   binding, by the composing enable, the first function with the specified plurality of supporting functions and the plurality of respective other functions;
   in response to the binding, providing the plurality of supporting function requests, a specification of the plurality of respective other functions, and the composition logic to the requestor;
   receiving each of the plurality of supporting function requests and respective other requests, in order, from the requestor; and
   if all the supporting function requests are satisfied, passing a first function request to one of the other functions for the first function and passing a response from the one of the other functions back to the requestor, wherein the execution policy is able to specify that at least one of the supporting function requests is ordered to be executed after the response from the one of the other functions is generated.

8. The method of claim 7 wherein before receiving the request for the first function, the method further comprises:

receiving from the requestor a request to discover target functions; and providing a specification of the first target function to the requestor.

9. The method of claim 7 wherein the plurality of function requests comprises a first set of composed supporting function requests and a composed first target function request; the first set of composed supporting function requests being requested before the composed first target function request as specified by the composition logic in the execution policy.

10. The method of claim 9 wherein the first set of composed supporting function requests comprises service requests selected from a group consisting of authentication services, authorization services, accounting services, integrity validation services, certification services, personalization services, and service discovery services.

11. The method of claim 10 wherein the first set of composed target function requests further comprises service requests selected from a group consisting of session management services, user services, encryption services, and decryption services.

12. The method of claim 9 wherein the plurality of target function requests also comprises a second set of composed supporting and target function requests, the second set of composed supporting and target function requests being requested after the composed first target function request as specified by the composition logic in the execution policy, the second set of composed supporting and target function requests comprising service requests selected from a group consisting of optimization services, routing services, composition services, coordination services, and aggregation services.

13. The method of claim 9 wherein the plurality of target function requests also comprises a second set of supporting and target function requests; and wherein the second set of composed supporting and target function requests are requested after the composed first service request as specified by the composition logic in the execution policy.

14. A system for enforcing execution policies for target functions, comprising:

component for receiving a request for a first target function from a requestor;

component for determining a list of providers being configured to provide the requested first target function;

component for determining an execution policy associated with the first target function, the execution policy specifying a plurality of supporting functions, a plurality of respective other functions, and a composition logic, such that the specified supporting functions and respective other functions are discoverable by the requestor;

component for dynamically composing, by a composing enabler, a plurality of function requests for each of the specified supporting functions and respective other functions component for selecting one of the providers from the list of providers to provide the requested first function;

component for binding, by the composing enable, the first function with the specified plurality of supporting functions and the plurality of respective other functions;

in response to the binding, component for providing the plurality of supporting function requests, a specification of the plurality of respective other functions, and the composition logic to the requestor;

receiving each of the plurality of Supporting function requests and respective other requests, in order, from the requestor; and component for if all the supporting function requests are satisfied, passing a first function request to one of the other functions for the first function and passing a response from the one of the other functions back to the requestor, wherein the execution policy is able to specify that at least one of the supporting function requests is ordered to be executed after the response from the one of the other functions is generated.

15. The system of claim 1 wherein the target function comprises a composition of functions defined in the execution policy.

* * * * *

UNITED STATES PATENT AND TRADEMARK OFFICE
CERTIFICATE OF CORRECTION

| | | |
|---|---|---|
| PATENT NO. | : 7,873,716 B2 | Page 1 of 1 |
| APPLICATION NO. | : 10/856588 | |
| DATED | : January 18, 2011 | |
| INVENTOR(S) | : Stephane H. Maes | |

It is certified that error appears in the above-identified patent and that said Letters Patent is hereby corrected as shown below:

IN THE DRAWINGS
Sheet 3 of 7, in Figure 3A, Ref. Numeral 260, line 2, after "RETRIEVED" delete "RETRIEVED".

In column 2, line 42, delete "communicatable" and insert -- communicable --, therefor.

In column 7, line 8, delete "step." and insert -- step, --, therefor.

In column 7, line 11, delete "?" and insert -- . --, therefor.

In column 11, line 1, delete "The" and insert -- the --, therefor.

In column 11, line 7, delete "requester" and insert -- requestor --, therefor.

In column 11, line 65, delete "enable," and insert -- enabler, --, therefor.

In column 12, line 41, in claim 7, delete "function," and insert -- function; --, therefor.

In column 14, line 20-22, in claim 14, delete "functions component for selecting one of the providers from the list of providers to provide the requested first function;" and
insert -- functions;
component for selecting one of the providers from the list of providers to provide the requested first function; --, therefor.

In column 14, line 30, in claim 14, delete "Supporting" and insert -- supporting --, therefor.

Signed and Sealed this
Twenty-seventh Day of December, 2011

David J. Kappos
*Director of the United States Patent and Trademark Office*